June 9, 1953 H. G. HUGHEY 2,641,312
SECTIONAL BLOCK-TYPE SCARFING TIP
Filed Aug. 23, 1947 3 Sheets-Sheet 1

INVENTOR
HOWARD G. HUGHEY
BY
ATTORNEYS

June 9, 1953          H. G. HUGHEY          2,641,312
SECTIONAL BLOCK-TYPE SCARFING TIP
Filed Aug. 23, 1947          3 Sheets-Sheet 2
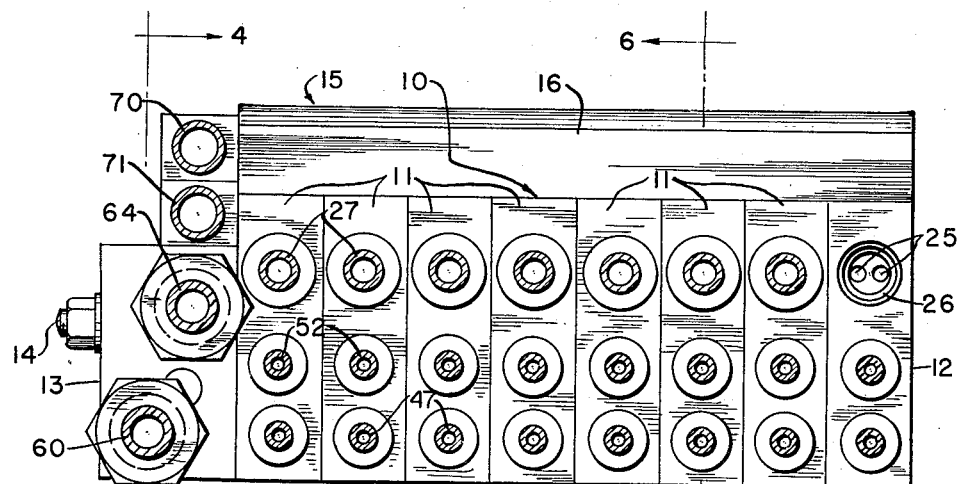
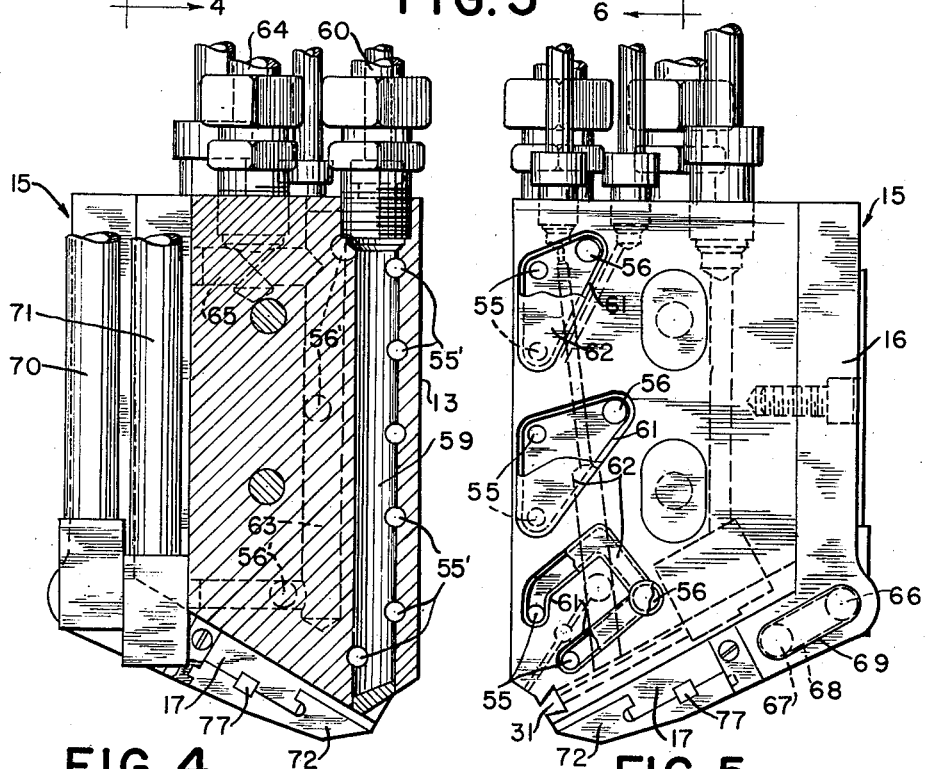
INVENTOR
HOWARD G. HUGHEY
BY
Pennie, Edmonds, Morton & Barrows
ATTORNEYS

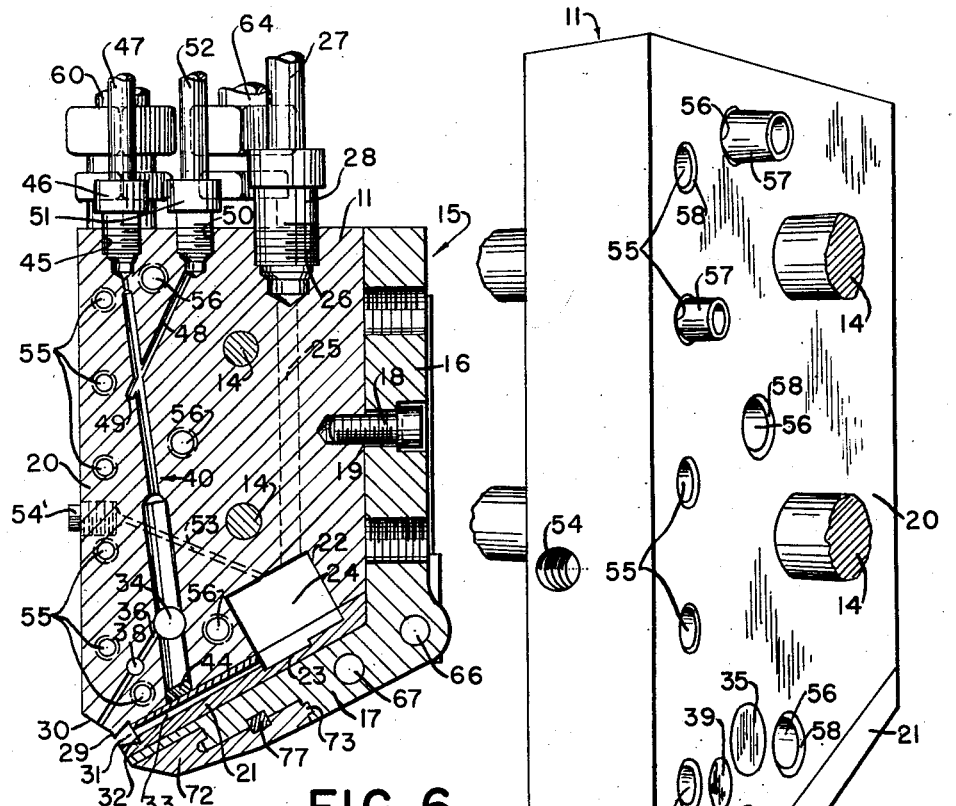
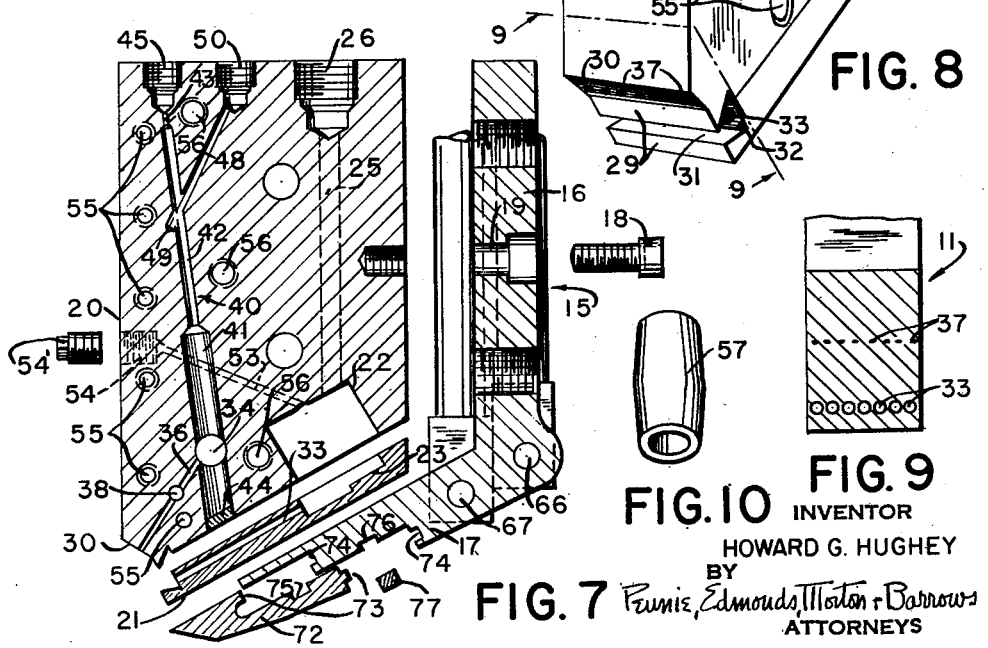

Patented June 9, 1953

2,641,312

UNITED STATES PATENT OFFICE 2,641,312

SECTIONAL BLOCK-TYPE SCARFING TIP

Howard G. Hughey, Fanwood, N. J., assignor to Air Reduction Company, Incorporated, a corporation of New York Application August 23, 1947, Serial No. 770,236

13 Claims. (Cl. 158—27.4)

This invention relates to improvements in torch tips, and more particularly to improvements in tips for scarfing torches of the kind used for thermo-chemically desurfacing ferrous metal bodies such as billets, blooms, slabs, and the like.

The invention provides a segmental scarfing tip of the block type which may be given any desired width by assembling the requisite number of individual smaller block tips or scarfing segments. Each individual scarfing segment has its own separately controlled supply of scarfing oxygen and preheating gases so that the effective width of the complete tip may be varied to adapt it for scarfing surfaces of different widths. The individual scarfing segments are specially constructed, not only to facilitate their manufacture and to facilitate their assembly into the complete tip, but also to make it possible to position the jet passages for the scarfing oxygen close enough together to provide a substantially continuous sheet-like stream of scarfing oxygen across any desired active width of the composite tip. Some of these features of the invention, and others hereinafter described, are useful in torch tips intended for other uses than scarfing.

The principal object of the invention, therefore, is to provide a block type segmental scarfing tip of improved construction. Other objects of the invention are to provide an improved cooling system for a segmental block type torch tip; to provide a segmental torch tip in which shocks occurring during use of the tip have no harmful effects on the tip segments; to provide a block type tip segment of improved construction which facilitates its manufacture and facilitates its assembly with other similar segments into a composite block type segmental tip; to equip scarfing tip segments which have independent distributing chambers for the scarfing oxygen with means whereby in the complete tip assembled from the segments the pressure of the scarfing oxygen in the distributing chamber of any segment of the tip may be readily ascertained; and to provide an improved type of shoe means for a torch tip block either of the single or segmental type.

A block type segmental tip embodying the invention is illustrated in the accompanying drawings, in which:

Fig. 3 is a plan view of the tip shown in Fig. 1;

Fig. 4 is a vertical transverse section taken approximately on the line 4—4 of Fig. 3;

Fig. 5 is a right side view of the torch tip shown in Fig. 1;

Fig. 6 is a transverse vertical section taken approximately on the line 6—6 of Fig. 3;

Fig. 7 is a view corresponding to Fig. 6 but showing the parts in unassembled relation;

Fig. 8 is a perspective view of one of the individual scarfing segments;

Fig. 9 is a section through the nose portion of one of the scarfing segments, the section being taken approximately in the plane of the line 9—9 of Fig. 8; and Fig. 10 is a perspective view of one of the thimble couplings employed for connecting corresponding cooling passage sections in adjacent scarfing segments.

Figure 1:
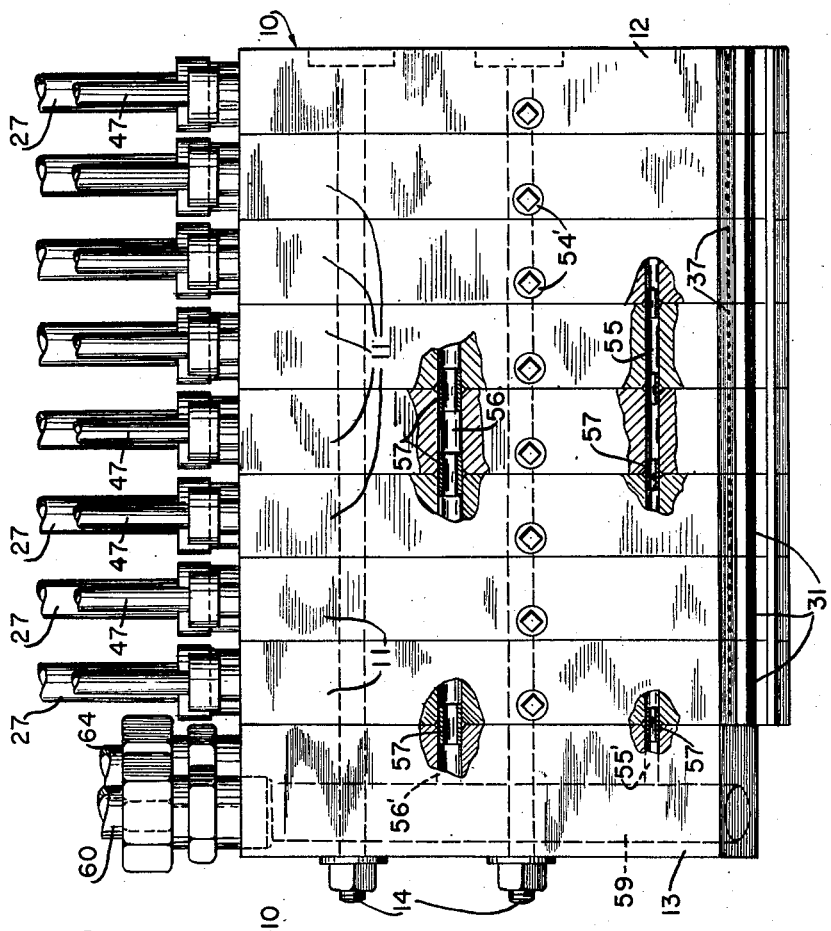
Figure 1 is a front elevation of the assembled torch tip.
Figure 2:
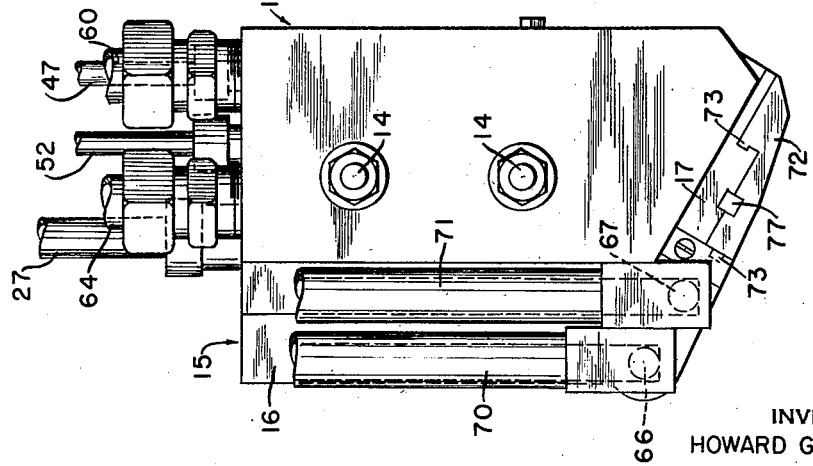
Fig. 2 is a left side view of the torch tip shown in Fig. 1.

Referring first to Fig. 1, the segmental torch tip 10 illustrated therein comprises an assembly of nine individual segments or tip blocks. The seven blocks designated 11 are scarfing segments of identical construction. The end block 12 is also a scarfing segment but differs slightly in construction from the scarfing segments 11, as will hereinafter appear. The segment 13 at the other end of the assembly constitutes a manifold block for the water-cooling system for the complete torch tip. One of the individual scarfing segments 11 is shown in perspective in Fig. 8. All of the tip segments are clamped together in one unit by bolts 14 (Fig. 1).

The tip segments are carried by a support, designated in general by the reference numeral 15 in Figs. 2–7 inclusive, having two angularly disposed portions 16 and 17, preferably in one piece, which extend the entire width of the whole assembled group of scarfing segments. Each of the scarfing segments is secured at its rear edge face to the portion 16 of the support by means of a screw 18 (Figs. 6 and 7). As shown in Fig. 6 the screws 18 pass loosely through holes 19 in the portion 16 of the support and are threaded into openings in the scarfing segments. The holes 19 in the support are slightly larger in diameter than the screws 18 so that when the bolts 14 are tightened the scarfing segments may move sidewise. If any of the scarfing segments happen to be undersize in width the screws 18 will not prevent the segments from being brought firmly together.

The portion 17 of the support 15 constitutes a shoe portion the outer side of which (the lower side as viewed in Figs. 6 and 7) is provided with work-engaging shoes as hereinafter described. The inner side of the shoe portion 17 (the upper side as viewed in Figs. 6 and 7) forms an obtuse angle with the inner surface of the portion 16 of the support and all of the scarfing segments are so shaped that the rear edge face of each of them makes a corresponding angle with its lower edge face (as viewed in Figs. 6–8) so that the support and the scarfing segments are complementary.

The construction of each of the scarfing segments 11 is best shown in Figs. 6 and 7. Each of them comprises a composite block made up of a main body portion 20 and a plate 21 which is interposed between the body portion 20 and the shoe portion 17 of the support. The face of the body portion 20 which adjoins the plate 21 is provided with a recess 22 and the plate 21 is provided with a complementary recess 23. The two recesses 22 and 23 in conjunction form an enclosed scarfing oxygen distributing chamber 24 which is located wholly within the segment so that each scarfing segment has its own independent distributing chamber.

The body portion 20 is drilled to provide a pair of vertical passages 25 (Figs. 3 and 6) leading to the distributing chamber 24 from a threaded recess 26 in the upper edge face of the body portion (Fig. 7). Scarfing oxygen is delivered to the passages 25 by a pipe 27 (Fig. 6) leading to an inlet connection 28 screwed into the threaded recess 26. Thus, scarfing oxygen delivered by the pipe 27 passes directly to the scarfing oxygen distributing chamber 24 through the passages 25.

As best shown in Fig. 8 the composite tip segment formed by the main body portion 20 and the plate 21 has a nose portion which is formed by the converging front edge face of the tip segment and the face which rests against the upper surface of the shoe portion 17 of the support. This nose portion is truncated to form one face 29 which lies in one plane and another face 30 which lies in a plane having a less steep angle with the work surface. The jet passages for the preheating gases open through the face 30 as will hereinafter appear. The face 29 has a recess 31, preferably dovetail shape in cross-section, which extends transversely across the tip segment. The bottom 32 of this recess constitutes the discharge face for the scarfing oxygen jets. As will be seen from Figs. 6 and 7 the dovetail recess 31 is formed partly in the main body portion 20 of the composite tip segment and partly in the plate 21 of the tip segment, one side of the recess being in the body portion and the other side being in the plate. The two complementary portions of the dovetail recess can be conveniently formed in the parts before they are assembled, whereas it would be difficult to machine a recess of that cross-sectional shape in a single solid block.

The plate 21 is drilled to provide a series of jet passages 33 (Figs. 6 and 7) which lead from the distributing chamber 24 to the bottom wall 32 of the recess 31.

Just forward of the scarfing oxygen distributing chamber 24 there is a distributing chamber for the gas mixture that feeds the preheating flames. This distributing chamber may comprise a cross-bore 34 in the body portion 20, the opposite ends of which are closed by plates, one of which appears at 35 in Fig. 8. The abovementioned face 30 at the nose of the tip segment is drilled to provide a row of jet passages 36 (Figs. 6 and 7) which communicate with the distributing chamber 34 and terminate in a row of discharge orifices 37 in the face (Fig. 8). A second cross-bore 38 (Figs. 6 and 7) intersects the jet passages 36 and creates more equal distribution of the gas mixture to the row of jet passages and an even flame front when the mixture issues from the discharge orifices 37 and is ignited. The opposite ends of the cross-bore 38 are closed by two plates one of which appears at 39 in Fig. 8.

A gas mixture for the preheating flames is delivered to the distributing chamber 34 by a vertical passage 40 drilled into the lower face of the body portion 20 (Fig. 7) and having a lower portion 41 of relatively large diameter, an intermediate portion 42 of smaller diameter, and an upper portion 43 of still smaller diameter. The lower end of the passage 40 is plugged as shown at 44. At the upper end of the passage 40 there is a threaded recess 45 (Fig. 7) into which is screwed an inlet connection 46 (Fig. 6) associated with a pipe 47 that delivers acetylene or other fuel-gas to the passage 40. The top face of the body portion 20 is drilled to provide a diagonal passage 48 which intersects the intermediate portion 42 of the passage 40 and extends slightly beyond it as shown at 49 (Fig. 7). At the upper end of the passage 48 there is a threaded recess 50 into which is screwed an inlet connection 51 (Fig. 6) associated with a preheating oxygen supply pipe 52. The preheating oxygen entering through the passage 48 mixes with the fuel-gas in the passage 40 and the mixture is delivered to the distributing chamber 34 from which it passes through the row of jet passages 36 to feed the row of preheating flames at the discharge orifices 37 (Fig. 8). The portion 49 of the diagonal passage 48 which extends beyond the passage 40 (Fig. 7) forms a niche which produces turbulence in the gases and insures a thorough mixture of them when they are delivered to the enlarged portion 41 of the passage 40.

The body portion 20 of each of the scarfing segments is also drilled to provide a passage 53 which extends from the front edge face of the tip segment to the distributing chamber 24 for the scarfing oxygen. The upper end of this passage communicates with a threaded recess 54 (Figs. 7 and 8) which is closed by a removable plug 54' (Figs. 6 and 7). This provides means whereby the pressure of the scarfing oxygen in the distributing chamber of any scarfing segment may be tested for the purpose that will later appear.

Each scarfing section of the tip is drilled transversely to provide a vertical series of cooling passage sections 55 extending through its forward portion, and another vertical series of cooling passage sections 56 to the rear of the cooling passage sections 55 (Figs. 6–8). When the segments are assembled the corresponding drillings in adjacent scarfing segments are interconnected by means of thimble couplings 57, one of which is shown by itself in Fig. 10. They are preferably made of relatively soft metal such as copper and have tapered ends to permit them to be forced into the drillings 55 and 56 when the scarfing segments are forced together. The ends of drillings 55 and 56 are preferably countersunk so that the edge of the openings at the ends of the drillings is bevelled as shown at 58 in Fig. 8. These bevels provide a slight clearance between adjoining segment faces to receive any burrs that may be formed on the thimble couplings when they are forced into place so that the burrs will not interfere with the close positioning of the tip segments. Each thimble coupling fits tightly in the two drillings in which it is inserted and connects them in a watertight manner when the tip segments are forced together. The cooling passage sections 55 are thus connected to form continuous cooling passages which extend throughout the combined width of all of the scarfing segments of the tip close to the front wall of the tip, and the cooling passage sections 56 are similarly connected to form continuous cooling passages which extend throughout the combined width of all of the scarfing segments of the tip and which lie to the rear of the first-mentioned ones.

The manifold block 13 has a vertically disposed distributing chamber 59 (Fig. 4) to which a cooling medium such as water is admitted through an inlet pipe 60. Each of the forward cooling passages 55 in the group of scarfing segments communicates with the distributing chamber 59 in the manifold block by means of a transverse drilling 55' (Fig. 4) in the manifold block and one of the thimble couplings 57 previously described (Fig. 1). Therefore, cooling water supplied by the pipe 60 flows in parallel paths by means of the coupled drillings 55 and 55' through all of the scarfing sections of the tip from left to right as the tip is viewed in Fig. 1. The coupled drillings 56 in the scarfing segments constitute return passages for the cooling water. There may be a return passage for each of the forward passages, but preferably there is only one of such return passages for each two of the forward passages. The end scarfing section 12 has a series of recesses 61 (Fig. 5) closed at the outer face of this segment by means of plates 62. Each of these recesses places two of the forward cooling passages in communication with one of the return passages as shown in Fig. 5. The drillings 56 are therefore made larger in diameter than the drillings 55 so that they can return the total amount of cooling water delivered to the right end of the tip by the forward cooling passages.

Referring again to Fig. 4 it will be seen that the manifold block 13 has a vertically disposed collection chamber 63 for the cooling water. Each of the return cooling passages 56 in the group of scarfing segments communicates with the collection chamber 63 in the manifold block by means of a transverse drilling 56' (Fig. 4) in the manifold block and one of the thimble couplings 57 (Fig. 1). The cooling water returned by all of the return passages therefore flows into the collection chamber 63 and is discharged therefrom to an outlet pipe 64 through a connecting passage 65 in the manifold block. The drillings 55 are placed near the forward face of each scarfing section of the tip so that the continuous cooling passages formed by them will adequately cool this portion of the tip in which the heat concentration is the greatest. Any suitable number of passages may be provided as long as the capacity of the cooling system is great enough to circulate a sufficient quantity of cooling water through the tip to maintain a safe temperature.

An independent cooling system is provided for the support 15. As shown in Fig. 5, cooling passages 66 and 67 extend through the support from one end of the group of scarfing segments to the other. At one end of the support these passages are connected by a recess 68 closed at its outer side by a cover plate 69. At the other end of the support cooling water is delivered to one of the passages by a tube 70 and is discharged from the other passage by a second tube 71 (Fig. 4).

The side of the shoe portion 17 of the support adjacent the work surface is provided with a number of work-engaging shoes 72 (Figs. 6 and 7). The shoes are of the same width as the scarfing segments of the tip and are easily removable to permit their replacement when they become worn. This is preferably accomplished by shaping the shoes as best shown in Fig. 7 so that each of them has a pair of projections 73 which are received by complementary shaped recesses 74 in the support when the shoe is slid rearwardly into position under the shoe portion 17 of the support. When the shoes are in this position a recess 75 in each shoe registers with a complementary recess 76 in the portion 17 of the support to form a keyway which receives a key 77. It is obvious that when the key is in position the shoes are locked to the shoe portion 17 of the support since they cannot move forwardly, and so long as they cannot do so the projections 73 on the shoes engaging in the recesses 74 on the support hold the shoes in position. When any shoe becomes worn it can be readily removed and replaced by withdrawing the key 77.

The shoes 72 and the support 15 transmit shocks directly to that part of the scarfing machine to which the support is attached without harmful effects on the scarfing segments. This would not be true if the scarfing segments were sandwiched between the shoes and such part of the scarfing machine in such a way that they had to transmit the shocks.

It will now be seen that each scarfing segment is a complete scarfing tip in itself except for the cooling system, having its own preheat passages and mixer for the preheating gases and its own scarfing oxygen distributing chamber and scarfing oxygen jet passages. Each scarfing segment also has its own supply of scarfing oxygen and its own supply of preheating gases. These are controlled separately for each scarfing segment by suitable valves which are not shown.

The complete tip may comprise any number of scarfing segments and can be of any desired width. Ordinarily, enough scarfing segments will be used in making up the tip to give the complete tip a total width that will make it capable of scarfing the widest work-piece that is likely to require scarfing in the particular installation in which the scarfing tip is employed. For narrower work-pieces the effective width of the tip can be reduced accordingly by shutting off the supply of gases to the scarfing segments that are not required. It is therefore advantageous that the scarfing segments be quite narrow so that the effective width of the complete tip can be reduced in small increments. In the tip illustrated they are only one inch wide, although of course they may be wider than that if desired. The jet passages 33 for the scarfing oxygen are drilled in each scarfing segment as close together as practicable. For instance, as shown in Fig. 9, a scarfing segment one inch in width may have seven scarfing oxygen jet passages made with a one-eighth inch drill so that the centers of the passages are spaced $9/64''$ apart. Because of the close spacing of the scarfing oxygen jet passages (which would not be possible if the scarfing jets issued through separate nozzles secured to a torch head) and because of the kind of cooling system employed (which eliminates the necessity of having a cooling chamber in each scarfing segment with side walls in which a scarfing oxygen jet passage can not be located) the scarfing oxygen issues in jets that are so closely spaced across the entire width of the complete tip that the scarfing oxygen is substantially in the form of a continuous sheet. The front edges of the dovetail recess 31, the bottom wall of which serves as a discharge face for the scarfing oxygen jets, constitute baffles which act on the scarfing oxygen jets after they have expanded substantially to atmospheric pressure to convert them into a still more sheet-like form. Each recess 31 in one scarfing segment aligns with and forms a continuation of the recess in an adjacent scarfing segment to form in effect a single recess which extends continuously throughout the combined width of all of the scarfing segments. A scarfing method in which a row of individual scarfing oxygen jets are baffled by the edges of a recess through the bottom wall of which the scarfing jets are discharged is claimed in the copending application of Joseph F. Kiernan, Serial No. 742,011, filed April 17, 1947, now Patent No. 2,532,103, assigned to the same assignee as the present application, and that application covers more broadly than the present one a scarfing tip having a recess similar in general to that above described, and the edges of which have a baffling action on the scarfing oxygen jets.

By removing the plugs 54' the pressure of the scarfing oxygen in the distributing chambers of all of the scarfing segments may be tested, and the valves which control the supply of scarfing oxygen to the scarfing segments can then be adjusted to make the pressure of the scarfing oxygen in all of the distributing chambers uniform. Or, if it is desired to have the scarfing oxygen jets issue in a non-uniform pattern so that by so doing the scarfed surface on the work-piece will then be substantially smooth or given some special shape such as concave or convex, the valves that control the supply of scarfing oxygen are adjusted accordingly. The plugs 54' are then repositioned and the tip will then be permanently calibrated until replacement of some worn or damaged scarfing segment necessitates recalibration, or until some different pattern of oxygen flow is desired.

The special construction of the block type scarfing segments makes them easy to manufacture and also makes it possible to position the jet passages for the scarfing oxygen close enough together to provide a substantially continuous sheet-like stream of scarfing oxygen across any desired active width of the complete tip.

I claim:

1. A segmental scarfing tip comprising a block made up of a plurality of individual smaller blocks positioned side by side and each of which has a recess extending across the width of one of its faces the bottom wall of which constitutes a discharge face, the outer edges of the recess being spaced apart a distance equal to less than the transverse dimension of the bottom wall thereof, each individual block also having wholly within itself a row of jet passages extending to said recess and terminating in a row of discharge orifices formed in the bottom wall of the recess, means for distributing scarfing oxygen to all of the jet passages in said row, and means for holding the individual blocks together with their recesses in alignment to form a continuous recess throughout the combined width of all of the blocks, the edges of the recess having a baffling action on the scarfing oxygen jets to convert them into a more sheet-like form.

2. In a gas torch, a segmental torch tip comprising a plurality of individual segments positioned side by side and each of which has a discharge face, each individual segment also having a row of jet passages leading to its discharge face, means for distributing gas to all of the jet passages in such row, a common support for all of said individual segments, means for holding the individual segments together and affixed to said common support, said support having a shoe-supporting portion common to all of said segments and provided with shoe means adapted to engage the work and keep the individual segments out of contact with the work, said support further having another portion rigid with the shoe-supporting portion adapted to be secured to a supporting structure whereby the shock received by the shoe means is transmitted through the portions of said support to the supporting structure independently of said individual segments.

3. A gas torch in accordance with claim 2 in which the shoe means comprises a series of individual shoes, and means for securing all of the shoes to the work-side of the shoe-supporting portion of the support.

4. In a segmental torch tip comprising a plurality of individual blocks positioned side by side and held together in that relation, the improvement which comprises a cooling system for the torch tip including a plurality of pairs of cooling passage sections extending transversely through each of said blocks from one of its side faces to the other so that each cooling passage section in each block is in alignment with the corresponding cooling passage section in an adjacent block, means connecting each cooling passage section in each block in a liquid-tight manner with the corresponding cooling passage section in the adjacent block to produce a plurality of pairs of continuous cooling passages which are common to all of said blocks, means at one end of the torch tip for placing the two continuous cooling passages of each pair in communication, and a manifold block at the other end of the torch tip having a distributing chamber communicating with one continuous cooling passage of each pair and a collection chamber communicating with the other continuous cooling passage of each pair, means for delivering cooling liquid to said distributing chamber, and means for discharging the cooling liquid from said collection chamber.

5. In a segmental torch tip comprising a plurality of individual blocks positioned side by side and held together in that relation, the improvement which comprises a cooling system for the torch tip including a plurality of pairs of cooling passage sections extending transversely through each of said blocks from one of its side faces to the other so that each cooling passage section in each block is in alignment with the corresponding cooling passage section in an adjacent block, means connecting each cooling passage section in each block in a liquid-tight manner with the corresponding cooling passage section in the adjacent block to produce a plurality of pairs of continuous cooling passages which are common to all of said blocks, one of the end blocks having a plurality of recesses each of which places the two continuous cooling passages of each pair in communication at that end of the torch tip, a manifold block at the other end of the torch tip having a distributing chamber communicating with one continuous cooling passage of each pair and having a collection chamber communicating with the other continuous cooling passage of each pair, means for delivering cooling liquid to said distributing chamber, and means for discharging the cooling liquid from said collection chamber.

6. A segmental scarfing tip comprising a plurality of segments positioned side by side and each of which has a discharge face, means for holding the segments together in that relation, each segment having an independent distributing chamber for scarfing oxygen, means for delivering scarfing oxygen to said chamber, valve means for controlling the supply of scarfing oxygen to the distributing chamber of each segment independently of the distributing chambers of the other segments, each segment also having a row of jet passages extending from its distributing chamber to its discharge face, a conduit operatively associated with each segment leading from its distributing chamber to an external wall of the segment, and a removable member at said external wall normally closing the end of said conduit whereby upon removal of any such member the pressure of the scarfing oxygen in the distributing chamber of the corresponding segment can be tested.

7. A segmental scarfing tip comprising a plurality of metal blocks positioned side by side and each of which has a discharge face, means for holding the blocks together in that relation, each block having an independent distributing chamber therein for scarfing oxygen, means for delivering scarfing oxygen to said distributing chamber, valve means for controlling the supply of scarfing oxygen to the distributing chamber of each block independently of the distributing chambers of the other blocks, each block also being provided with a row of jet passages extending from its distributing chamber to its discharge face, a passage formed in the metal of each block extending from the distributing chamber in the block to an external wall of the block, and a removable plug at said external wall of each block normally closing the end of said passage whereby upon removal of any plug the pressure of the scarfing oxygen in the distributing chamber of the corresponding block can be tested.

8. In a gas torch, a support having a shoe-supporting portion provided at one side with shoe means adapted to engage the work and adapted to support at its opposite side a tip block made up of two complementary parts, one of said parts being a main body portion and the other part being a member held between a face of the body portion and said opposite side of the shoe portion of the support, said face of the body portion being provided with a recess, the adjacent face of said member being provided with a complementing recess forming with the recess in the main body portion an enclosed gas distributing chamber, said member also having a plurality of jet passages leading from its recess to one of its edges, and means for delivering gas to said distributing chamber.

9. A composite scarfing torch tip block having two separate complementary parts, one of said parts having a recess in one face, the second part of the tip block having a complementing recess adapted to form with the recess in the first part an enclosed distributing chamber for scarfing oxygen, the second part of the tip block also having a plurality of bores wholly within it forming jet passages leading from its recess to one face of the composite block, means for holding the two complementary parts of the block in assembled relation, and means for delivering scarfing oxygen to the distributing chamber, the composite block having in that face to which said jet passages lead a discharge recess one side of which is formed in said one part of the composite block and the other side of which is formed in the said other part of the composite block, said jet passages terminating in a row of discharge orifices in the bottom wall of said discharge recess.

10. A composite scarfing torch tip block having two separate complementary parts, one of said parts being a main body portion having a recess in one face and the second part being a plate having a complementary recess adapted to form with the recess in the main body portion an enclosed distributing chamber for scarfing oxygen, the plate having a plurality of bores wholly within it forming jet passages wholly therein leading from its recess to one face of the composite block, means for holding the main body portion and the plate in assembled relation, and means for delivering scarfing oxygen to the distributing chamber, the composite block having in that face to which said jet passages lead a discharge recess one side of which is formed in said main body portion and the other side of which is formed in the plate, said jet passages terminating in a row of discharge orifices in the bottom wall of said discharge recess.

11. A segmental scarfing tip comprising a plurality of individual blocks positioned side by side and each of which has a discharge face and substantially flat side walls, each of said individual blocks being provided with a row of jet passages leading to the discharge face of the block, means for distributing scarfing oxygen to all of the jet passages in such row, each of said individual blocks having a cooling passage section extending transversely through it from one of it side walls to the other, clamping means clamping all of said individual blocks together, and sealing means connecting each cooling passage section in each of said blocks in a liquid-tight manner with the corresponding cooling passage section in the adjacent block when the blocks are clamped together by said clamping means to form a continuous liquid-tight cooling passage which is common to all of said individual blocks, and means for circulating a cooling liquid through said cooling passage.

12. A segmental scarfing tip comprising a plurality of individual blocks positioned side by side and each of which has a discharge face and substantially flat side walls, each of said individual blocks being provided with a row of jet passages leading to the discharge face of the block, means for distributing scarfing oxygen to all of the jet passages in such a row, each of said individual blocks having a pair of cooling passage sections extending transversely through it from one of its side walls to the other, clamping means clamping all of said individual blocks together, sealing means connecting each cooling passage section in each of said blocks in a liquid-tight manner with the correspondng cooling passage section in the adjacent block when said blocks are clamped together by said clamping means to thereby form a pair of continuous liquid-tight cooling passages which are common to all of said blocks, means at one end of the torch tip for placing the two continuous cooling passages in communication, and means at the other end of the torch tip for introducing cooling liquid to one of the continuous cooling passages and for discharging it from the other passage.

13. A segmental torch tip in accordance with claim 12 in which said means at one end of the torch tip for placing the two continuous cooling passages in communication comprises an end block having a recess that communicates with both of said continuous cooling passages.

HOWARD G. HUGHEY.

References Cited in the file of this patent

UNITED STATES PATENTS

| Number | Name | Date |
|---|---|---|
| 557,506 | Nyberg et al. | Mar. 31, 1896 |
| 1,371,481 | Hartfield | Mar. 15, 1921 |
| 2,058,388 | Rendleman | Oct. 20, 1936 |
| 2,220,245 | Jones et al. | Nov. 5, 1940 |
| 2,288,898 | French | July 7, 1942 |
| 2,362,536 | Bucknam | Nov. 14, 1944 |
| 2,398,884 | Crowe | Apr. 23, 1946 |
| 2,417,670 | Anthes | Mar. 18, 1947 |
| 2,418,208 | Walker | Apr. 1, 1947 |
| 2,435,638 | Shorter | Feb. 10, 1948 |
| 2,484,123 | Scherl | Oct. 11, 1949 |

FOREIGN PATENTS

| Number | Country | Date |
|---|---|---|
| 703,339 | Germany | Mar. 6, 1941 |